United States Patent [19]

Lace et al.

[11] 4,015,789
[45] Apr. 5, 1977

[54] REVERSIBLE CARTRIDGE TAPE PLAYER SYSTEM WITH SIDE DRIVE

[75] Inventors: Melvin A. Lace, Prospect Heights; Fernand F. Pelletier, Elmhurst, both of Ill.

[73] Assignee: Motorola, Inc., Schaumburg, Ill.

[22] Filed: Aug. 5, 1974

[21] Appl. No.: 491,431

[52] U.S. Cl. .......................... 242/55.19 R; 360/93
[51] Int. Cl.² .................. G11B 15/20; G11B 15/44
[58] Field of Search ............ 242/55.19 A, 55.19 R, 242/55.21; 360/93

[56] References Cited

UNITED STATES PATENTS

| | | | |
|---|---|---|---|
| 2,837,332 | 6/1958 | Busch | 242/55.19 A |
| 3,488,013 | 1/1970 | Sasaki | 242/55.21 |
| 3,593,935 | 7/1971 | Ritz | 242/55.19 A |
| 3,675,867 | 7/1972 | Solomon | 242/55.19 A |
| 3,677,628 | 7/1972 | Walker | 242/55.19 A |
| 3,893,757 | 7/1975 | Donnici | 242/55.19 A |
| 3,894,699 | 7/1975 | Bara | 242/55.19 A |

*Primary Examiner*—Harry N. Haroian
*Attorney, Agent, or Firm*—James W. Gillman; Donald J. Lisa

[57] ABSTRACT

A side access opening is provided in a side wall of a continuous loop tape cartridge which is normally driven in a forward direction by the capstan of a tape player through an access opening in its front wall to remove tape from a central hub at the inner convolution thereof and to return it to the hub at the outer convolution. A cooperating side drive mechanism is provided in the tape player housing adjacent the side access opening in the cartridge. The tape is driven in a reverse direction through the cartridge by the side drive mechanism of the player through the side access opening to remove tape from the hub at the outer convolution thereof and to return it to the hub at the inner convolution by being coupled to a vertical peripheral wall portion of the cartridge hub at a point spaced a predetermined distance from the axis of rotation of the hub. The coupling relation is effected either directly through the outer convolution of tape or directly to the rim of the hub or simultaneously through both means. Further alternative embodiments are provided for coupling the drive means of the player to the hub through one or more idler wheels in the cartridge. Several embodiments of a side drive are disclosed. Actuating means selectively couple the side drive mchanism to the hub. Means are also provided for using the side drive mechanism to drive the tape in a fast forward direction through the cartridge. In reverse winding, the tape is guided onto the peripheral wall portion of the hub by being applied against an adjacent curved flange portion of the hub. A pivotable lever momentarily moves the cartridge outwardly in the player cartridge receiving cavity to disengage the capstan from its coupled relation to the tape through the front access opening whenever the reverse or fast forward modes of operation are selected. In one embodiment means are provided for reversing the direction of rotation of the player drive as appropriate to drive the tape forwardly or in reverse.

50 Claims, 20 Drawing Figures

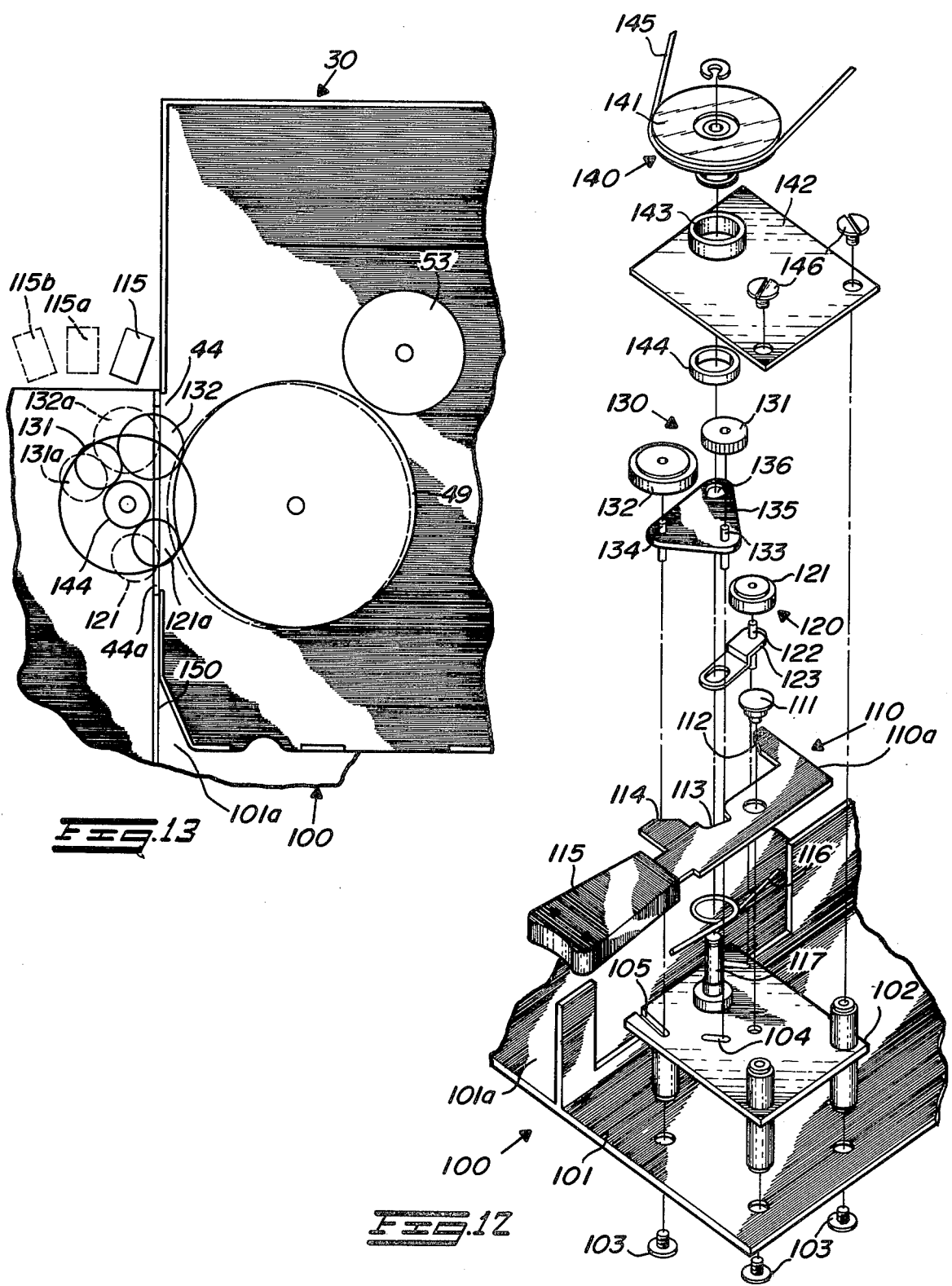

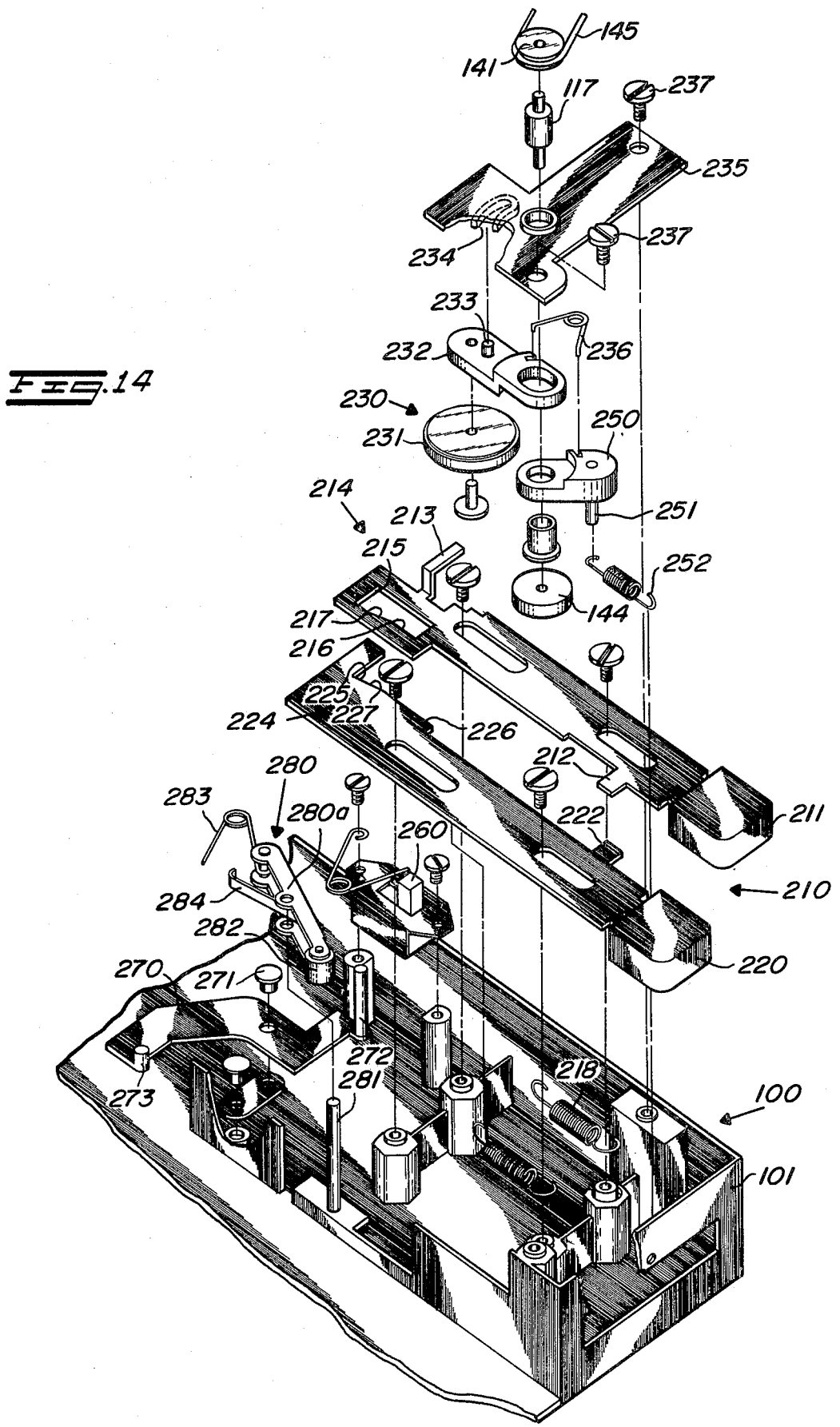

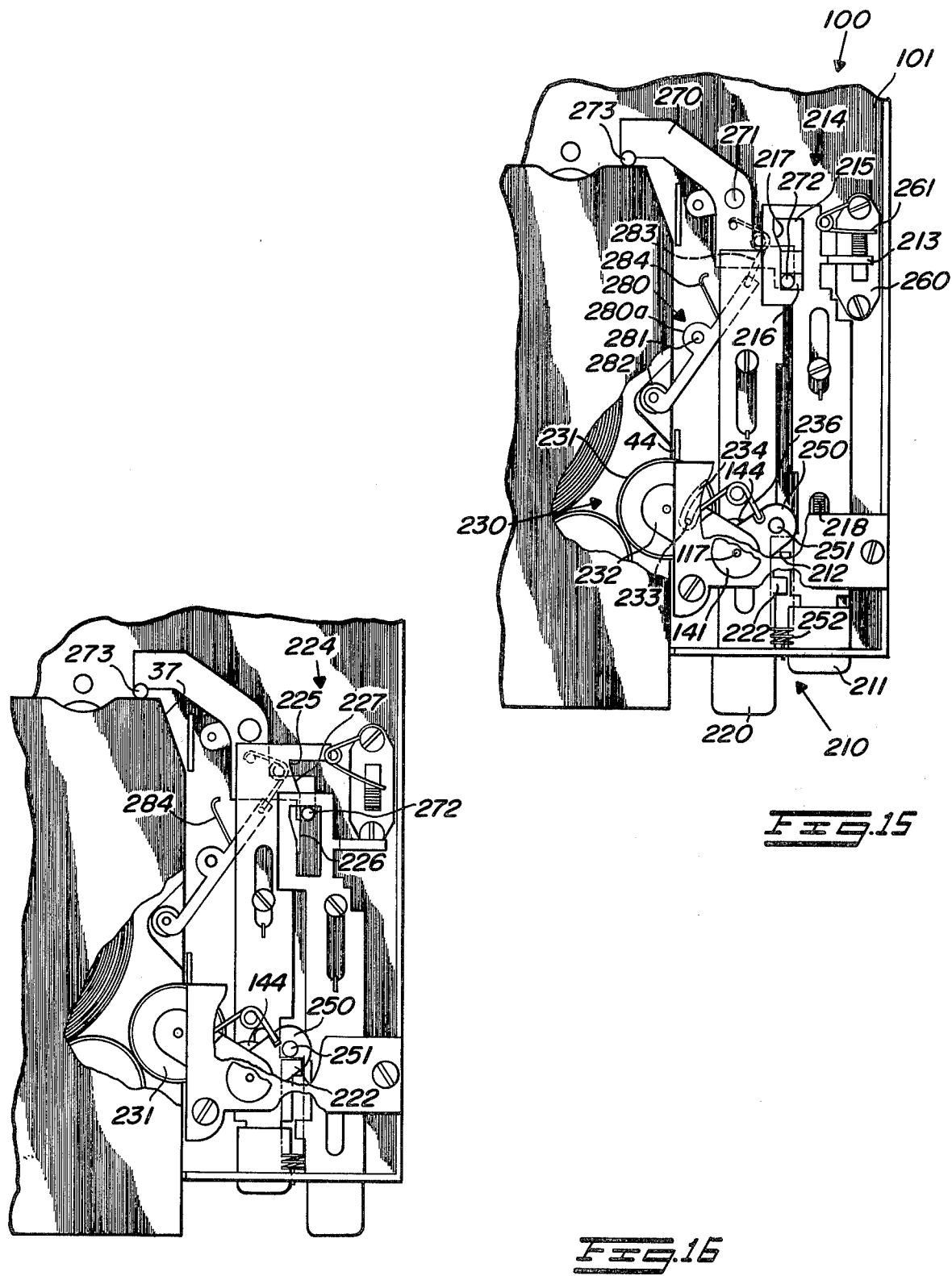

REVERSIBLE CARTRIDGE TAPE PLAYER SYSTEM WITH SIDE DRIVE

BACKGROUND

This invention relates to magnetic tape player systems generally and, more particularly, to continuous loop, multiple track tape cartridges and the means for driving the tape through said cartridges in a reverse or fast forward direction when fully inserted in a cartridge tape player.

Cartridge tape players have been in use in the home and in automobiles for many years and have been very popular since their introduction into the magnetic tape market. However, there have been several continuing needs relating to this product which have not been fully satisfied.

The use of cartridge-type tape player entertainment units in automobiles, for example, has created a need to reduce the overall size of the cartridge tape player system. This requirement results from the necessity to efficiently use the available space on dashboards of automobiles for originally installed equipment, the realization that smaller units usually result in less cost, the lack of available space underneath automobile dashboards for placing entertainment units which are not original equipment and the general desirability and appeal of the slim-line look. Thus, there is a continuous need in the automotive entertainment industry to make entertainment type units which are thin in vertical dimension and generally compact. This need is not so apparent in the home entertainment field.

A more substantial need which has defied resolution until recently, is that cartridge type tape player systems are not reversible whereas reel to reel tape player systems and cassette tape player systems are reversible. This failure has placed tape player market systems at a competitive disadvantage in comparison to the other tape systems. Further absent a reverse capability, a tape cartridge system with a record capability has little or no appeal. Consequently, the need for entertainment units which can record as well as playback magnetic tapes has been largely filled by reel to reel or cassette systems. The reason is obvious. In present day cartridge tape player systems the user is unable to quickly move the tape in the cartridge to a preselected point for playing or recording except by moving it in a fast forward direction. That is, if a desired recording on the tape is to be played or if it desired to record at a predetermined location on the tape, such as immediately following a recording error, it is necessary to wind the tape all the way through the cartridge in a forward direction in order to get to the desired point. Users find this shortcoming highly unsatisfactory, even though a fast forward mode is provided. On the other hand, with a reversible tape feature, it would be highly desirable in many instances to quickly reverse wind the cartridge to the desired location on the tape.

Recently a 1 inch high cartridge tape player has been proposed and is disclosed in U.S. Pat. No. 3,915,365 which is assigned to the same assignee as is assigned the present application. While the proposed system is a substantial advance in building a thin cartridge tape player system, it is not reversible.

Similarly, a reversible cartridge tape player system has been recently proposed and is disclosed in U.S. Pat. No. 3,894,699 which is assigned to the same assignee as is assigned the present application. Here again, while that disclosed system is a very significant and substantial contribution to the art of making cartridge tape players the disclosed reverse mechanism results in a bulky type player which is suitable for use in the home, but which is not suitable for use in the car because it is not able to accomodate the principle of spacesaving thinness which is of paramount importance in the present automobile cartridge tape player market.

At the present time there is no known one inch high reversible cartridge tape player for automobiles.

The present invention overcomes the aforesaid shortcomings by providing not only new means of driving the tape in reverse in a cartridge but also an improved tape player drive mechanism which accomodates the principle of thinness and compactness in the vertical dimension.

SUMMARY OF THE INVENTION

Accordingly, the present invention has as its objects to provide:

1. A tape cartridge which can be driven in a reverse direction by improved means in a smooth and efficient manner.

2. A tape cartridge which can be driven in a reverse direction through a side access opening in the cartridge.

3. A tape cartridge in which the tape player drive mechanism is coupled to a vertical peripheral surface of the hub means in the cartridge.

4. A tape cartridge which is driven in reverse by directly applying a tape driving force against the outer convolutions of tape wound on the cartridge hub.

5. A tape cartridge which is driven in reverse by coupling the tape player drive means directly to the side of the rim of the tape cartridge hub on which the tape is wound.

6. A tape cartridge in which the outer convolution of tape and the hub are each directly driven simultaneously in a reverse direction.

7. A cartridge tape player which has a side drive means which is coupled to the hub of the tape cartridge through a side access opening in the cartridge and which drives the tape in a reverse or fast forward direction through the cartridge.

8. A cartridge tape player system which is only 1 inch high.

9. A cartridge tape player system which has improved fast forward and reverse drive mechanisms.

10. An improved method for guiding the tape onto the cartridge hub during reverse winding.

Briefly, a cartridge tape player system according to the present invention utilizes a tape cartridge which has a standard housing dimensioned for receipt in the cartridge cavity of a cartridge tape player. The cartridge has a hub means rotatably mounted in the cartridge with a continuous loop tape wound on the hub means and is adapted to be coupled to the capstan through an opening in the front wall of the cartridge and to be thereby driven through the cartridge in a forward direction by being removed from the hub at the inner convolution and returned to the hub at the outer convolution. The standard cartridge is modified in that in one of the side walls of the cartridge housing there is an additional access opening through which the cartridge hub is adapted to be coupled to a coupling means in the player. The coupling means in the player is mounted at a predetermined location at the edge of the tape cartridge receiving cavity of the player and is laterally moved through the side access opening of the cartridge wall into coupled relation with an upstanding wall portion of the hub at a point spaced from the axis of rotation of the hub by applying the rotative force directly to the outer convolutions of tape wound on the hub or by applying the rotative force directly to the rim of the hub, or doing both simultaneously for thereby driving the hub and the tape in a reverse or forward direction. A flange on the upstanding wall of the hub is used to smoothly guide the tape onto the hub.

The tape player of the present invention is provided with an engaging means to selectively couple the coupling means to the player drive means and to the cartridge hub to rotate the hub and thereby drive the tape through the cartridge in the desired direction.

Additional features and objects of the invention will be apparent from the description of the drawings and the preferred embodiments which follows.

DESCRIPTION OF THE DRAWINGS

FIG. 12 is an exploded perspective view of the side drive means of the present invention, showing one embodiment thereof.

FIG. 13 is a fragmentary plan view of just the side drive wheel assembly of FIG. 12 in combination with a tape cartridge having an idler pivotable into direct contact with the hub for driving the hub in reverse or fast forward.

FIG. 14 is an exploded perspective of an alternative embodiment of the player side drive means of the present invention showing a two lever mechanism for driving the tape in the cartridge in a reverse or fast forward mode.

DESCRIPTION OF THE PREFERRED EMBODIMENTS

Reference is now made to the drawings in greater detail wherein like numerals have been employed throughout the various views to designate similar components.

We will first describe the theory of operation of our means for driving the hub and tape cartridge in a reverse direction by coupling a player mounted side drive member directly to the outer convolution of tape. FIGS. 1 to 5 demonstrate the dynamic principles which are involved.

Figure 1:
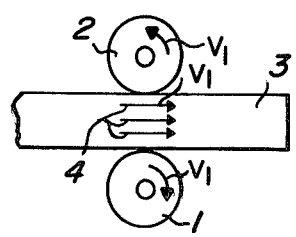
FIG. 1 is a plan view illustrating the effect on a hard solid material being moved through two drive rolls without reducing the thickness of the solid material.

In FIG. 1 rolls 1 and 2 are each drive rolls rotating at the same rotational speed about fixed axis so that a point on the periphery of either roller is moving at the same speed $V_1$. Material 3 is a material which is moved through the nip of rolls 1 and 2 due to the rotation of the rolls. In FIG. 1, material 3 is a deformable hard solid, such as steel. The length of the arrows 4 indicate the velocity of molecules within the solid relative to each other at various locations within the material 3 between the nip of the rolls 1, 2. In FIG. 1 obviously all the molecules have the same speed relative to each other, and that speed is equal to the velocity $V_1$ of the drive rolls 1, 2. The thickness of the material entering the nip of the rolls 1, 2 is equal to the thickness of the material coming out of the nip of the rolls. Therefore, the relative velocity of the molecules upstream and downstream of the nip is the same as in the nip.

Figure 2:
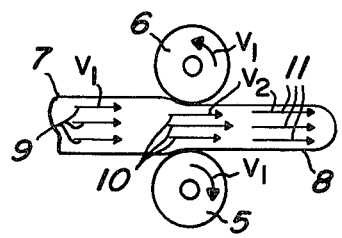
FIG. 2 is a plan view illustrating the effect on a hard solid material being moved through two drive rolls spaced apart in a manner to reduce the thickness of the material.

In FIG. 2 rolls 5 and 6 are each drive rolls again rotatably mounted on fixed axis. Material 7 is again a deformable hard solid material such as steel. However, now the thickness of material 7 going into the nip of the rolls is permanently reduced to the thickness of material 8 when it comes out of the rolls. The arrows 9 indicate that the velocity $V_1$ of the molecules relative to each other of the material going into the nip of the rolls is the same at all locations and is equal to the speed of the periphery of rolls 5, 6. Arrows 10 indicate that most of the inner molecules are speeded up to a higher velocity $V_2$ as they come through the nip of the rolls due to the squeezing that occurs, the centermost molecules being given a greater push forward than adjacent molecules. Arrows 11 indicate that downstream of the nip all the molecules are, of course, going at the same but increased velocity $V_2$. This is true because although there is a tendency of the centermost molecules to speed up in the nip of the rolls, the cohesive strength of the molecules in material 7 is too strong and is not thereby overcome.

Figure 3:
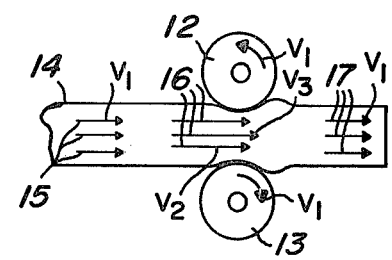
FIG. 3 is a plan view illustrating the effect on a soft solid material which is squeezed when it is moved through two drive rolls.

In FIG. 3 there is shown drive wheels 12 and 13 and, in this instance, the material being drawn through the nip of the rolls is a soft, elastic, solid material 14 which is reduced in thickness in the nip of the rolls. Arrows 15 indicate that the molecules upstream of the nip are all at the same velocity $V_1$ equal to the velocity of the drive rolls 12, 13. Arrows 16 indicate that in the nip of the rolls, the molecules again display a tendency to speed up to a velocity $V_2$, the centermost molecules tending to go at a speed $V_3$ slightly faster than the speed of the molecules in layers adjacent the surface of drive rolls 12 and 13. Even so, downstream of the nip of the rolls, the molecules are proceeding at the same velocity $V_1$ and have returned to their original position and thickness, due to the inherent elasticity and cohesive strength of the molecules of the material 14, there being no permanent extension of the material 14 taking place as a result of having passed through rolls 12 and 13.

In FIG. 4 there is shown again two drive rolls 18 and 19 the peripheries of which are rotating at equal velocities $V_1$. Here the material 20 that is being drawn into the nip of the rolls is a laminated material which is made up of separate, distinct and independent layers stacked atop one another, (such as individual strips of magnetic tape for tape players). The individual layers are separated from each other by a small air space and are lubricated and free to slide relative to each other if a lateral force is applied thereto. Arrows 21 upstream of the nip of the drive rolls indicate that the laminations of material 20 nearest the center have a velocity $V_3$ greater than the velocity $V_2$ of the outer laminations. The reason for this is that, as shown by arrows 22, when the material 20 is squeezed in the nip of rolls 18, 19 the centermost laminations are speeded up to a velocity $V_3$ whereas those outermost convolutions tend to go at the speed $V_1$ of the drive rolls 18, 19 and those inbetween tend to go at an intermediate speed $V_2$. Arrows 23 indicate that downstream of the nip of the rolls, since the laminations are not individually extensible but are able to move relative to each other, there is a tendency for the center laminations to maintain the increased speed for an unspecified distance of travel downstream.

Figure 4:
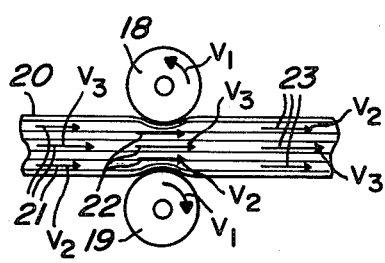
FIG. 4 is a plan view illustrating the effect on a laminated material squeezed between two drive rolls.
Figure 5:
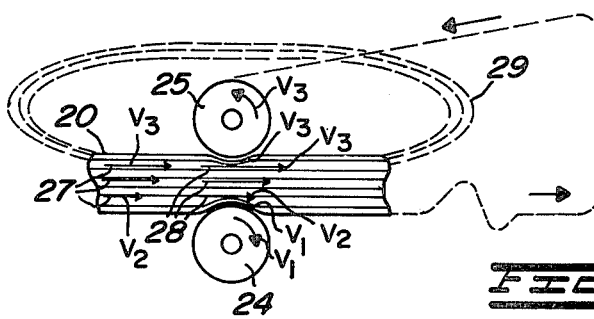
FIG. 5 is a plan view illustrating the effect on a laminated material and a driven roll when the material is squeezed between the driven roll and a drive roll.

FIG. 5 is similar to FIG. 4 except that here only roll 24 is a drive roll whose periphery is driven at speed $V_1$ and roll 25 is an idler roll which is free to rotate at whatever speed is imparted to its peripheral surface by the adjacent layers of laminated material 20. Material 20 is again the same material that was shown in FIG. 4. Arrows 27 indicate that upstream the layers of material furthest removed from the drive roll 24 have a velocity $V_3$ higher than the velocity $V_2$ of the laminations of material 20 nearer the drive roll 24. The reason for this is, as indicated by arrows 28, that in the nip of the rolls the laminations immediately adjacent drive roll 24 have a tendency to travel at the peripheral speed $V_1$ of drive roll 24 at that point. The laminations further removed from the peripheral surface of the drive roll 24 have a gradually increased velocity $V_2$ or $V_3$ for the reason stated as to FIG. 4. In addition, since roll 25 is an idler roll which is free to rotate at any driven speed and since there is inherent friction existing between all the laminations and which has a tendency to keep all the laminations moving at the same speed through the nip of the rolls, therefore, the laminations immediately adjacent the periphery of roll 25 will also tend to travel at the increased velocity $V_3$. The result is that idler roll 25 will be driven at substantially the speed $V_3$ of the outer laminations immediately adjacent its periphery and higher than the speed $V_1$ of the drive roll 24.

The ratio of the velocities $V_3$ to $V_1$ is a function of how much force is applied to squeeze the laminations between the rolls 24, 25 and the amount of friction which is permitted to exist between individual laminations. Too small a squeezing force defeats the coupling effect. Too high a friction force defeats the ability of the coupling to drive the driven roll at a higher speed than the drive roll. In practice we have found that a ratio in the range of approximately 1.05:1 or 1.1:1 has been successful. That is, when $V_3$ is a small percentage higher than $V_1$ during the initial transient start up of the rewind mode, any slack in the tape is quickly taken up at the hub and the rewind is successful and efficient.

It can now be seen that if the laminations of material 20, rather than being separate and distinct strips of material are in fact the convolutions of a continuous loop tape mounted in a tape cartridge, as generally indicated by the dotted lines 29 shown in FIG. 5, the above principles can be utilized to drive a continuous loop tape cartridge in a reverse direction to remove the tape from the hub at the outer convolution at a speed $V_1$ and, during the transient start up period, to return the tape to the hub at the inner convolution at a higher speed $V_3$ by simply coupling a drive wheel rotating at a speed $V_1$ to the outer convolution of tape, whereby the tape is successfully and efficiently driven within the cartridge in an endless manner without any slack or jamming due to initial take up at the inner hub being at a speed higher than feed off at the outer convolution.

Figure 6:
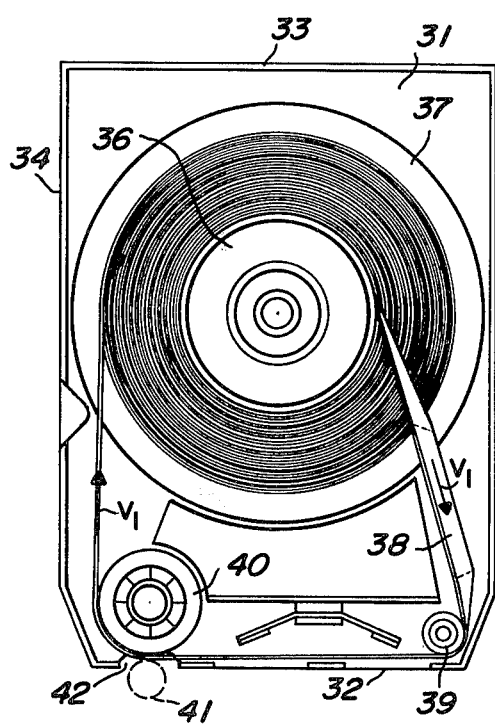
FIG. 6 is a plan view of a standard tape cartridge adapted for being driven in a forward direction only.

FIG. 6 shows a standard cartridge well known in the industry and which is not reversible. Cartridge 30 has a housing 31 with upstanding front and rear walls 32, 33 respectively and side walls 34, 35 respectively. A hub 36 is rotatably mounted in the cartridge on a platen 37 which may or may not be free to rotate independently of the hub when the hub is driven in the forward direction as is known in the art. A continuous loop tape 38 is wound on hub 36 in a predetermined path within the cartridge around idler wheel 39 and pressure roll 40 mounted at a predetermined location within the cartridge and spaced from the axis of rotation of hub 36. Tape 38 is a continuous loop tape and is adapted for being coupled to the capstan 41 shown in dotted lines through an access opening 42 in the front wall of the cartridge and to be driven through the cartridge in a forward direction by being removed from the hub means at the inner convolution and returned to the hub means at the outer convolution.

It is readily apparent that the loop of tape around idler wheel 39 and pressure roll 40 must be maintained with a tension thereon throughout its length so that no entanglement results. Necessarily the instantaneous velocity of the tape $V_1$ at the point where it is wound on the hub means at the outer convolution must be equal to the instantaneous velocity $V_1$ of the tape at the point where it is withdrawn from the hub at the inner convolution. However, it is also true that since the radius of the hub to the point where the tape is withdrawn from the inner convolution is smaller than the radius of the hub and the wound tape at the point where the tape is wound onto the hub at the outer convolution that, therefore the circumferential path travelled by the innermost convolution is smaller than the circumferential path travelled by the outer convolution. For each revolution of the outer convolution, the inner convolution makes more than 1 revolution and there is a slippage that occurs throughout the coil of tape wound on the hub means from the outer to the inner such that each succeeding inner convolution has a slight forward (clockwise in FIG. 6) motion relative to its adjacent outer convolution as it works its way inwardly to increasingly smaller circumferences until it gets to the hub where it is removed and sent to the outer convolution in an endless process.

Figure 7A:
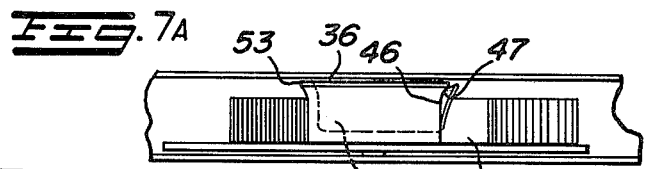
FIG. 7A is a vertical cross section of a portion of the tape cartridge of FIG. 7 showing the manner in which the tape is wound on the cartridge hub when it is squeezed against the peripheral wall portion of the tape and driven in reverse through the cartridge.
Figure 7:
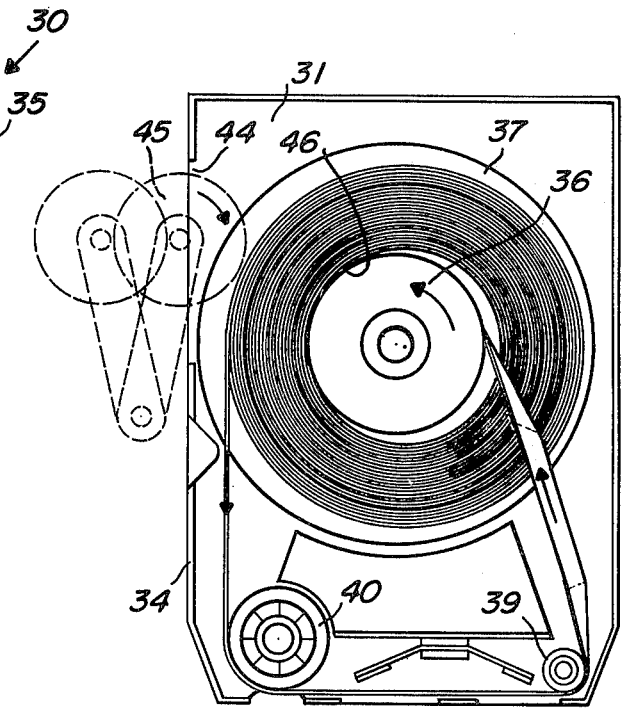
FIG. 7 is a plan view of a tape cartridge of the present invention adapted to be driven through a side access opening in a reverse or fast forward direction.

FIG. 7 is a reversible tape cartridge which embodies the present invention and which utilizes the principles explained in FIGS. 1 to 6 but for driving the tape in a reverse direction.

FIGS. 7 and 7A show a tape cartridge similar to the standard cartridge shown in FIG. 6. However the standard cartridge is modified as described hereinafter.

The upstanding side wall 34 of the cartridge has a second access opening 44 through which the cartridge is adapted to be coupled to a side drive member 45 rotatably mounted in the housing and indicated in dotted lines in FIG. 7. The cartridge hub 36 is again rotatably mounted to the housing 31. A tape 38 is wound on the hub and sits on a platen 37 which is free to rotate independently of the hub when the hub is driven in a reverse direction or which is optionally free or locked to the hub when the hub is driven in a fast forward direction. Clutch means to lock or unlock this hub 36 and the platen 37, as desired, is known and is not a part of this invention. Hub 36 has an upstanding vertical peripheral wall portion 46 as shown in FIG. 7A spaced a predetermined distance from the axis of rotation of the hub. The outer axial edge or rim portion 53 of the wall 46 extends beyond the tops of the tape convolutions and is curved outwardly slightly as at 47 to form a curved flange which functions as a guide means to guide the inner convolution of tape onto the peripheral wall 46 of the hub smoothly and efficiently when the tape is driven in the reverse direction.

The diameter of the hub 36 is selected on the basis of the amount of tape wound on hub 36 and the desired speed of rotation of hub 36.

In operation, in order to drive the tape in the reverse direction, the rotatable side drive member 45 mounted in the housing is moved laterally directly against the outer convolution of tape and is driven in a clockwise direction by a player drive motor (not shown), as described in greater detail below. All of the convolutions of tape between drive member 35 and the hub 36 are thereby tightly squeezed and, in this manner, the tape player drive motor is effectively coupled to the upstanding peripheral wall portion 46 of the hub 36. As explained in FIGS. 1 through 5 above when the convolutions of tape between the drive member and the hub are squeezed, a rotative force applied by the drive member 45 to the outer convolutions of tape at a predetermined speed $V_1$ will be transmitted to the free rolling hub 36 causing the periphery of the hub 36 to rotate in the opposite direction (counterclockwise was seen in FIG. 7) at a speed equal to or higher than the speed of rotation of the drive wheel 45. The result is that the clockwise rotation of drive wheel 45 when in physical contact with the outer convolution of tape results in a counterclockwise rotation of the hub 36 at a speed which is higher than drive wheel 45 during an initial transient period whereby any slack in the outer loop around pressure roll 40 and idler roll 39 is quickly taken up at the hub. Similarly the speed of the hub 36 is equal to the drive wheel 45 during steady state reverse winding whereby a constant tension is kept in the outer loops and whereby the tape is driven through the cartridge in the reverse direction by being removed from the hub means at the outer convolution and returned to the hub means at the inner convolution. There is thus an effective coupling between the drive means 45 and the upstanding peripheral wall portion 46 of the hub onto which the tape is wound. Also the slippage described above for a forward running tape is present in the reverse winding tape except each succeeding outer convolution has a slight rearward (clockwise) motion relative to its adjacent inner convolution as it gradually works its way outwardly to increasingly larger circumferences until it gets to the outermost convolution where it is removed and sent to the innermost convolution in an endless manner.

As explained in greater detail below, movement of the side drive 45 into coupled relation with the hub can be controlled by an actuating member mounted in the housing and operated by the operator.

As shown in FIG. 7A above, when drive member 45 is in coupled relation with the peripheral wall portion 46 of the hub through direct contact with the outer convolution of tape, the convolutions of tape squeezed between drive 45 and hub 36 are tightly compressed as shown in the left side of FIG. 7A. However, since the convolutions of tape surrounding the hub are generally loosely wound, the convolutions form a general elliptical pattern or shape around hub 36. There is a space 48 created between wall portion 46 and the innermost convolution of tape away from the point of contact, as shown in the right side of FIG. 7A. The space 48 thus defined, provides a convenient location for the tape 38 to return to the hub whereat it is guided by curved flange 47 of hub 36 onto the vertical peripheral wall portion 46 in a smooth efficient and nontangling manner.

Figure 8:
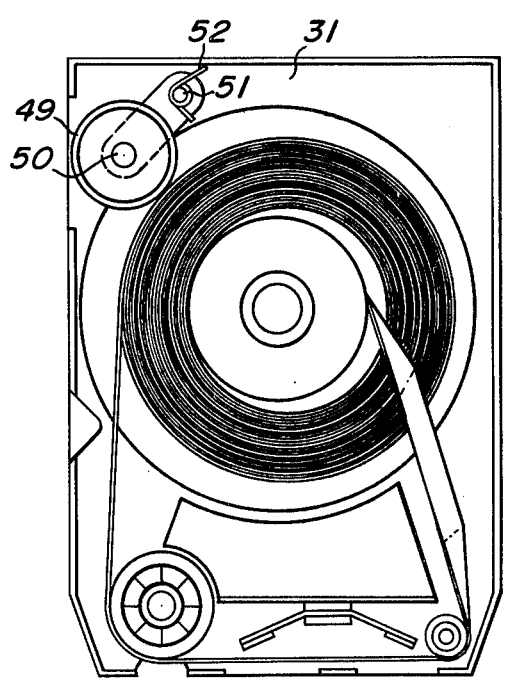
FIG. 8 is a plan view of an alternative embodiment of the tape cartridge showing an idler wheel being used to couple the rotative force to the hub directly through the outer convolution of tape wound on the hub.

In FIG. 8 there is shown a further modification to the standard cartridge. Here idler wheel 49 is rotatably mounted to shaft 50 which is pivotably mounted to shaft 51 secured to the base 31 of the cartridge. Torsion spring 52 biases wheel 49 to a first position (not shown) disengaged from the outer convolution of tape. Wheel 49 may then be pivoted to the second position shown in FIG. 8 engaging the outer convolution of tape. Idler wheel 49 is moved from the first disengaged position to the second engaged position in response to movement of the coupling member 45 (not shown) to thereby effect the coupled relation with the outer convolution of tape described in FIG. 7 at a point displaced radially from the axis of rotation of the cartridge hub 36.

Figure 9:
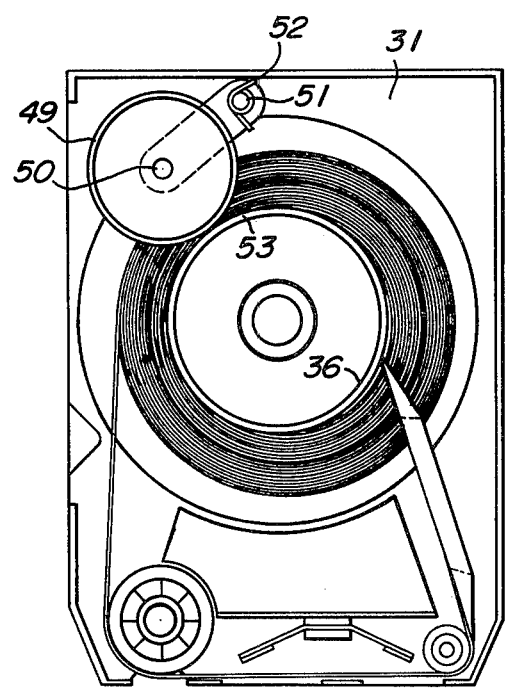
FIG. 9 is a plan view of a still further alternative embodiment of the tape cartridge showing an idler in the tape cartridge for coupling the rotative force to the hub by directly contacting the rim of the hub.
Figure 9A:
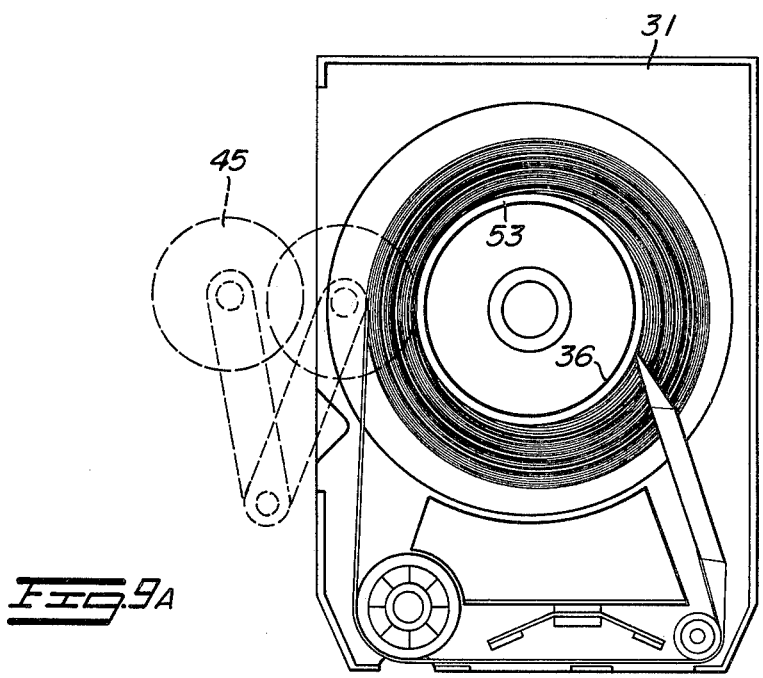
FIG. 9A shows an alternative embodiment for having the side drive wheel in the housing directly contact the rim of the hub without using the idler wheel.

FIG. 9 shows a still further embodiment of the present invention. There is shown in FIG. 9 the pivot wheel 49 similar to that shown in FIG. 8, However in FIG. 9 the hub 36 has a rim portion 53 (see FIG. 7a) which extends slightly over the tops of the convolutions of tape and which is directly contacted by the outer periphery of wheel 49. Thus, in FIG. 9 wheel 49 is in direct contact and coupled relation with the rim portion 53 of hub 36 and does not contact the outer convolution of tape. Wheel 49 is moved from its biased first position out of contact with rim 53 (not shown) to its second position in contact with rim 53 in response to movement of the player drive wheel 45 (not shown) into and out of coupled relation with wheel 49 as previously explained. If it is desired to eliminate wheel 49 in FIG. 9, the same result may be achieved as shown in FIG. 9A by simply having the coupling member 45 mounted in the housing in such a location that, as described in greater detail below, when the operator desires to actuate the rewind mode of operation, member 45 may be pivoted into direct contacting and coupled relation with the rim portion 53 of hub 36 by moving laterally over the tops of the convolutions of tape to contact the rim 53 as shown by the dotted lines in FIG. 9.

Figure 11:
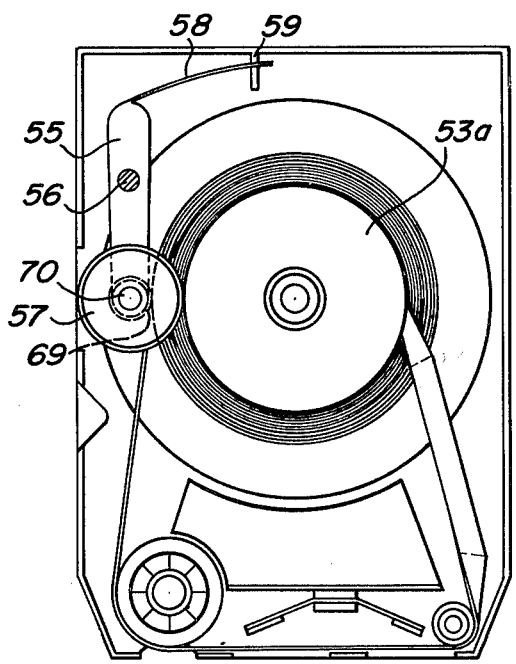
FIG. 11 is a plan view in partial section of a still further embodiment of the present invention showing two coaxial drive means for simultaneously directly driving the outer convolution of tape and a laterally extended rim portion of the hub means.
Figure 10:
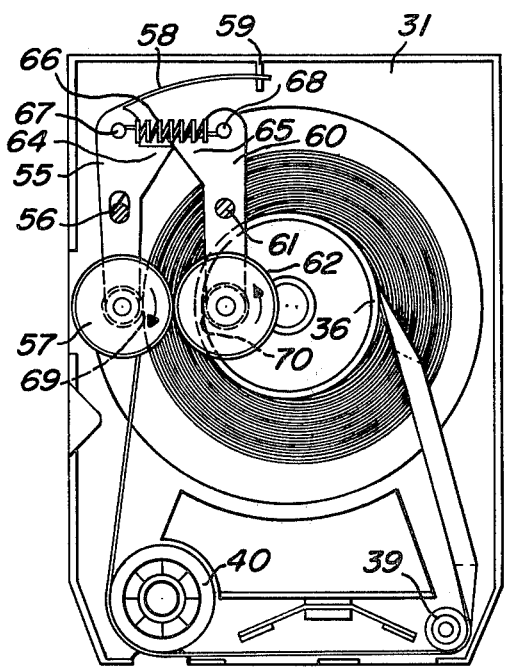
FIG. 10 is a plan view in partial section of a still further alternative embodiment of the tape cartridge of the present invention showing means for simultaneously directly driving the outer convolution of tape and the hub with separate drive means.

FIGS. 10 and 11 show a still further embodiment of the present invention except in these instances there are two drive means provided as idler wheels mounted in the cartridge, one for directly contacting and driving the hub 36 and the other for directly contacting and driving the outer convolution of tape simultaneously and at different speeds.

In FIG. 10 there is provided a tape drive arm 55 pivotably mounted to a post 56 which depends from the top cover (not shown) to the cartridge and securely mounts drive arm 55 in a fixed mounting. Attached rotatably to one end of drive arm 55 is the tape drive roll 57 the other end of drive arm 55 being biased by loose spring member 58 mounted in a friction mounting post 59 in base 31 of the cartridge housing. Also mounted in the cartridge is a second drum drive arm 60 secured to a post 61 mounted in the cover (not shown) of the cartridge. At one end of drum drive arm 60 roller 62 is rotatably mounted. Tape drive arm 55 has a cam arm 64 and drum drive arm 60 has a cam follower 65 which are designed to cooperate with each other. Roller arm spring 66 is secured by spring holding pins 67 and 68 to the respective ends of the drive arms 55, 60 biasing the upper end portion of arms 55 and 60 toward each other and causing cams 64 and cam follower 65 to be in contact with each other and biasing the rollers 57, 62 away from each other so that in the normal position the wheels are not in contact with each other. In the engaged position, roller 57 is adapted for contacting the outer convolution of tape with cylindrical portion 69 of reduced diameter while drum drive roller 62 has a reduced diameter portion 70 which extends downwardly into the recessed portion of the hub 36 and contacts the inner vertical peripheral edge portion 46a of the hub (See FIG. 7A).

Similarly, the upper portions of the tape drive wheel 57 and the drum drive wheel 62 have larger diameters which, in the engaged position, are also in contact with each other so that a rotative force applied to tape drive roll 57 may be effectively coupled to the drum drive roll 62.

In operation, a coupling member such as a side drive wheel 45 (not shown) mounted in the housing as previously explained, in response to a movement of an actuating member at the command of the operator, as more fully described below, may be moved laterally through access opening 44 into contact with the tape drive wheel 57 moving it rightward as shown in FIG. 10 and causing cylindrical portion 69 to contact the outer convolution of tape and squeeze all convolutions of tape between the cylindrical portion 69 and the hub 36. Arm 55 is pivoted about shaft 56 and moves the top portion of tape drive arm 55 to the left causing cam 64 to contact cam follower 65 and forcing the upper portion of drum drive arm 60 to the right as shown in FIG. 10 against the action of roller arm spring 66. Drum drive arm 60 is thereby pivoted about shaft 61 causing the lower end of arm 60 to move to the left coupling the large diameter portion of wheel 62 to the large diameter portion of wheel 57 and bringing the cylindrical portion of reduced diameter 70 into coupled relation with the inner vertical edge 46a of the upstanding wall portion 46 of the hub 36. Thereby, a rotative force applied to wheel 57 which causes wheel 57 to rotate in a clockwise direction will cause the outer convolution of tape to be removed from the hub and will impart a counterclockwise rotation to the hub 36 causing the tape to be wound onto the hub at the inner convolution thereof at a speed which keeps a constant tension on the outer loop of tape which goes around pressure roll 40 and idler 39. The coupling ratio of velocities imparted to the tape at the inner convolution and outer convolution respectively is in the order of 1.01 to 1. During the transient start up condition, the tape at the inner convolution has an instantaneous higher velocity than that at the outermost convolution. In steady state conditions, slippage occurs between the driving members and the tape surfaces such that the instantaneous velocity of the tape wound at the inner hub is equal to the velocity of the tape at the outermost convolution. Under all conditions, the angular velocity (degrees/second) of the tape at the inner convolution is higher than the angular velocity of the tape at the outer convolution.

In FIG. 11 there is shown an improved version of the simultaneous drive reversible cartridge shown in FIG. 10. In FIG. 11 wheels 62 and 57 are combined into a single wheel 57 of large diameter having again reduced diameter portion 69 as previously shown in FIG. 10. Here in FIG. 11 the rim portion 53a of the hub 36 is further extended radially from the axis of rotation so that it can be directly contacted by wheel 57 when the cylindrical portion of reduced diameter 69 is in direct contact with the outer convolution of tape. Again, in response to actuation of a control means, as explained in greater detail below, the tape player drive member, such as member 45 (not shown) can be driven into contact with the tape drive roll 57 moving it to the right into simultaneous coupled relation with the outer convolution of tape through contact with cylindrical portion 69 and with hub 36 through contact between the large diameter portion 57 and rim portion 53a whereby all of the convolutions of tape wound on the hub means are squeezed between the hub means and the cylindrical portion 69 and whereby the hub 36 and the inner convolution of tape are driven at an angular velocity greater than the angular velocity of the outer convolution of tape.

As shown in FIG. 11 wheel portions 57 and 69 may be separate wheels which are coaxially mounted in the cartridge and are therefore driven by the same shaft 70 or they may be a single wheel with a wide diameter portion and a reduced diameter portion for respectively contacting the hub 53 and the outer convolution of tape as aforesaid. Alternatively, it is not necessary to have any idler wheels at all mounted in the cartridge shown in FIG. 11. The simultaneous drive of the hub and of the outer convolution of tape as explained above relative to FIG. 11 can be accomplished by having the coupling member 45, which is a part of the side drive means mounted in the housing, shaped with wide diameter and reduced diameter portions corresponding to the portions 57, 69 those shown in FIG. 11 for idler wheel 57 and by being moved laterally into direct coupled relation with the outer convolution of tape and the extended rim portion 53a simultaneously in a manner similar to that explained in FIG. 9 but as to which there was only direct contact being made with the rim 53.

The foregoing explainations as applied to FIGS. 7 through 11 were stated with a view to providing a new means for driving the tape in a reverse direction through the cartridge whereby the tape is removed from the outer convolution of the hub means and returned to the hub means at the inner convolution thereof. As explained in greater detail below, it is readily apparent that the drive motor of the tape player can be adpated to drive the coupling member 45 in either of two directions. Consequently, the tape can be driven in either a reverse or a fast forward direction through the cartridge through the same side drive coupling relationship previously explained in FIGS. 7 through 11. In fast forward mode, the tape would be driven in a fast forward direction by being removed from the hub at the inner convolution thereof and returned to the hub at the outer convolution thereof. In the fast forward mode, it is preferably that the platen and hub be locked together by a one way clutch (not shown) and rotate about the same axis since they are concentric with each other.

Shown in FIGS. 12 and 13 is one embodiment of a cartridge tape player side drive mechanism of the present invention which can be used with the cartridges of the present invention described in FIGS. 7 to 11 in order to drive the tape through the cartridge in either a reverse or a fast forward direction.

As is well known in the art cartridge 30 shown in FIG. 13 is dimensioned to be received into a cartridge receiving cavity 101a in the player housing. In FIG. 13 cartridge 30 is positioned within said cavity although the complete player 100 and cavity 101a is not shown. Also not shown in FIG. 12 or 13 but well known in the art are the tape playing and driving instrumentalities which are needed in order to drive the tape through the cartridge in a forward direction and to play the information which is recorded on the tape. These instrumentalities include, inter alia, a drive motor and a capstan operatively connected to the drive motor, the capstan in communication with the cartridge cavity 101a and, when the cartridge is fully inserted in the cavity, in contact with the tape which is disposed along the front wall of the cartridge over the pressure roll 40, the capstan contacting said tape through a front access opening in the front wall. Also disposed in communication with the cavity for cooperation with the tape through a second access opening in the front wall of the cartridge is a magnetic tape head mounted in the player in communication with the cavity. Thus, when the tape is driven in a forward direction by the capstan when the tape cartridge is fully inserted in the cavity during a normal playback mode of operation of the player, the magnetic tape head is adapted to sense the recorded information and convert it to audible signals which are then sent to speakers and heard by the occupants of the car.

Shown in FIG. 12 is a drive means 140 mounted in the player housing for driving the tape in a reverse direction through the cartridge during a rewind mode of operation of the player, a means 130 mounted in the housing for coupling the drive means 140 to a peripheral surface portion 46 of the cartridge hub at a point radially spaced from the axis of rotation of the cartridge hub and a means 110 mounted for engaging the drive means 140 with the coupling means 130 to drive the hub 36 in the reverse direction through a side access opening 44 in the cartridge.

Referring now in detail to FIG. 12, the player is constructed in the following manner. Housing 100 has a base member 101 to which is mounted a bottom plate 102 by means of screws 103.

Actuator means 110 is pivotably mounted to base 102 by means of pivot pin 111. Actuator 110 is pivotable between three positions, as described in greater detail below, for engaging the tape drive motor with a rotatable coupling member for driving the hub in a reverse or fast forward direction. Therefore actuator 110 is a reverse or fast forward actuating lever arm. Lever arm 110 has a first cam portion 112 protruding from the rearward end of the lever arm, a second cam portion 113 which is a notch located only a short distance from the pivot pin 111 and a third cam portion 114 protruding from the forward end of the lever arm. The portion of lever arm 110 which extends outwardly from the tape player has a control arm 115 which is used by the operator to move lever arm 110 rightward as viewed in FIG. 12 to a fast forward position or leftward as viewed in FIG. 12 to a reverse position. Lever arm 110 is biased to a center position corresponding to the normal playback mode of operation by torsion spring 116 which is mounted over shaft 117. The manner in which lever arm 110 accomplishes these functions is described in greater detail below.

Also mounted to shaft 117 is a means 120 for coupling the tape player drive motor to the hub for driving the hub in a fast forward direction when the acutator arm 110 is moved from the center playback position to the right as shown in FIG. 12. The means 120 includes a fast forward drive wheel 121 rotatably mounted to a shaft 122 positioned at one end of a fast forward bracket 123 the other end of which is mounted to shaft 117. Thus fast forward bracket 123 is pivotable about shaft 117 between a first position coupled to the hub of the tape cartridge and a second position disengaged or uncoupled from the hub of the tape cartridge in response to the coaction between the lower end of shaft 122, which protrudes below the fast forward bracket, and cam 112 of lever arm 110 which contacts and moves shaft 122 when the control arm 115 is moved to the right position. When the control arm 115 is released, torsion spring 116 bearing against the lower end of pin 122 from the other direction returns the wheel 121 to the disengaged position and the control arm 115 to the center or playback mode position. The manner in which the rotation of the tape player drive motor is coupled to the fast forward wheel 122 is explained in greater detail below.

Also shown in FIG. 12 is means 130 for coupling the drive motor of the tape player to the hub for driving the hub in a reverse direction during a rewind mode of operation of the tape player. Coupling means 130 includes, idler wheel 131 and reverse drive wheel 132 each mounted on separate shafts 133 and 134 respectively which are mounted to reverse bracket 135. Reverse bracket 135 has an elongated opening 136 through which it is secured to shaft 117 for pivotable movement in response to movement of control arm 115 of the actuator lever 110. The lower portion of shaft 133 extends below reverse bracket 135 and slides in a slot 104 formed in base member 102. The lower portion of shaft 134 extends below reverse bracket 135 and it rides in a slot 105 formed in base 102. Movement of control arm 115 to the left as shown in FIG. 12 causes cam 113 to pick up shaft 133 and move it in slot 104 which causes reverse bracket 135 to pivot about shaft 117 but also to move inwardly relative to shaft 117 due to the widened area of opening 136 at the rear end thereof. This movement brings idler 131 into contact with the drive wheel means 140 which is being driven by the player drive motor. Simultaneously cam 114 picks up the lower portion of shaft 134 and moves it in slot 105 causing reverse bracket 135 to pivot about shaft 117 thereby moving wheel 132 into direct coupled relation with the peripheral surface portion 46 of the cartridge hub 36 at a point radially displaced from the axis of rotation of the cartridge hub means as previously explained in drawings 7 to 11. A rotative drive force is applied to wheel 132 by means of idler wheel 131 which is interposed into coupled relationship between drive wheel 144 and reverse drive wheel 132. It is noted that the vertical edges of idler wheel 131 are serated to provide good gripping power for transmitting the rotative force.

Release of control arm 115 causes spring 116 to bias the arm rightward as shown in FIG. 12 to the center position.

FIG. 12 also shows the drive means 140 mounted in the housing for driving the tape in a reverse direction through the cartridge during the rewind mode of operation. This means 140 includes a drive motor (not shown), a drive motor pulley driven by the drive motor (not shown), a fly wheel driven by the drive motor pulley (not shown), a capstan coupled to the fly wheel (not shown), and belt means for coupling the drive motor pulley to the fly wheel. Means 140 further includes a main drive wheel 141 which is rotatably mounted to top plate 142 through a journal aperture 143, the top plate being secured to the bottom plate by screws 146. The drive wheel 141 has a reduced diameter portion which slips through the journal aperture 143 and to the outer peripheral surface of which is secured a drive wheel ring 144 made of rubber or like material which ring has a predetermined diameter so that idler 131 can be placed into coupled relation therewith when control arm 115 is moved to the left rewind position and so that fast forward drive wheel 121 can be placed into coupled relation therewith when control arm 115 is moved to the right fast forward position. Thus, drive means 140 provide the means for driving the tape in either a reverse or fast forward direction by being coupled to reverse wheel 132 or fast forward wheel 121 which are in turn coupled to the cartridge hub means to rotate the tape in the desired direction all in response to movement of engaging means 110 which selectively engages the coupling means to drive the hub means as desired.

Shown in FIG. 13 in solid lines is the rewind mode of operation. Control arm 115 has been moved clockwise to the rewind position, forcing idler wheel 131 into a coupled relation between drive wheel ring 144 and reverse drive wheel 132 which in turn is coupled, through access opening 44, to an idler wheel 49 which is pivotably mounted (not shown) within cartridge 30 so that it is moved laterally from a disengaged position (dotted lines) into coupled relation directly in contact with the rim 53 of the hub 36 to drive the tape in a reverse direction through the cartridge. When control arm 115 is released it moves to the center position shown in dotted lines 115a so that idler wheel 131a is not in contact with drive wheel ring 144. When control arm 115 is moved counterclockwise to the fast forward position 115b the reverse drive wheel 121 is moved, through the access opening 44, to the engaged position 121a in coupled relation with drive wheel 144 and the idler wheel 133 of the cartridge to directly drive the hub in fast forward direction.

It is noted that coupling means 130 and 120 are movable laterally into coupled relation with a vertical peripheral surface portion 53 of the cartridge hub. As previously described that coupling relationship can be effected by having the reverse wheel 132 or the fast forward wheel 121 directly into contact with the outer convolution of tape wound on the hub as shown in FIG. 7, or by effecting the coupling relation through an idler wheel which in turn is coupled directly to the outer convolution of tape as shown in FIG. 8. Alternatively, the coupling relationship can be effected by having wheels 132, 121 directly coupled to the rim portion 53 of the hub means for directly driving the hub in the reverse or fast forward direction as shown in FIG. 9, or to be so driven through an idler wheel as also shown in FIG. 9. Finally, the coupling relationship can be effected by simultaneously coupling drive wheel 132 or reverse wheel 121 to the outer convolution of tape and to the rim portion of the hub either directly as mentioned above or through an idler wheel mounted in the cartridge as shown in FIGS. 10, 11. In the latter case the wheel 132 or 121 could be used in the form shown in FIG. 12 to drive the single shaft which coaxially carries both drive wheels 57 and 69. If the former mode is to be used, wheels 132 and 121 would have to be modified slightly so that it could simultaneously drive both the outer convolution of tape and the hub as previously explained above.

From FIG. 13 it is apparent that the rotation of the drive means 140 and the coupling means 130 should be at a predetermined location in the housing adjacent the side access opening 44 of the cartridge 30 when the latter is fully inserted in the housing cavity. Thus the side wall 150 (FIG. 13) of the housing which is adjacent to cavity 101 should have a corresponding opening 44a for access so that the coupling member 132 is located adjacent the access opening 44.

It should be noted that the belt 145 which provides the drive force to the drive means 140 may be taken from any of several different locations in the tape player such as directly from the drive motor or from the capstan.

Although it is not shown in FIGS. 12 and 13, it is to be understood by persons skilled in the art that when the lever 110 is moved to either the reverse or fast forward position, that through a mechanism not shown it it necessary to momentarily move the cartridge outwardly of the tape player cavity 101a a short distance to disengage the capstan from the pressure roll. In this manner the fast forward and reverse drive, as desired, can be effected without any drag being placed on the tape through the capstan. For a more detailed explanation of a working arrangement for moving the cartridge back in a reverse or fast forward mode of operation see U.S. Pat. No. 3,894,699 and assigned to the same assignee as is assigned this present application.

Also, the capstan and its drive connection to the tape through the access opening in the front wall may be used to drive the cartridge in a fast forward direction through a mechanism not shown but known to those skilled in the art.

Figures 15, 16:
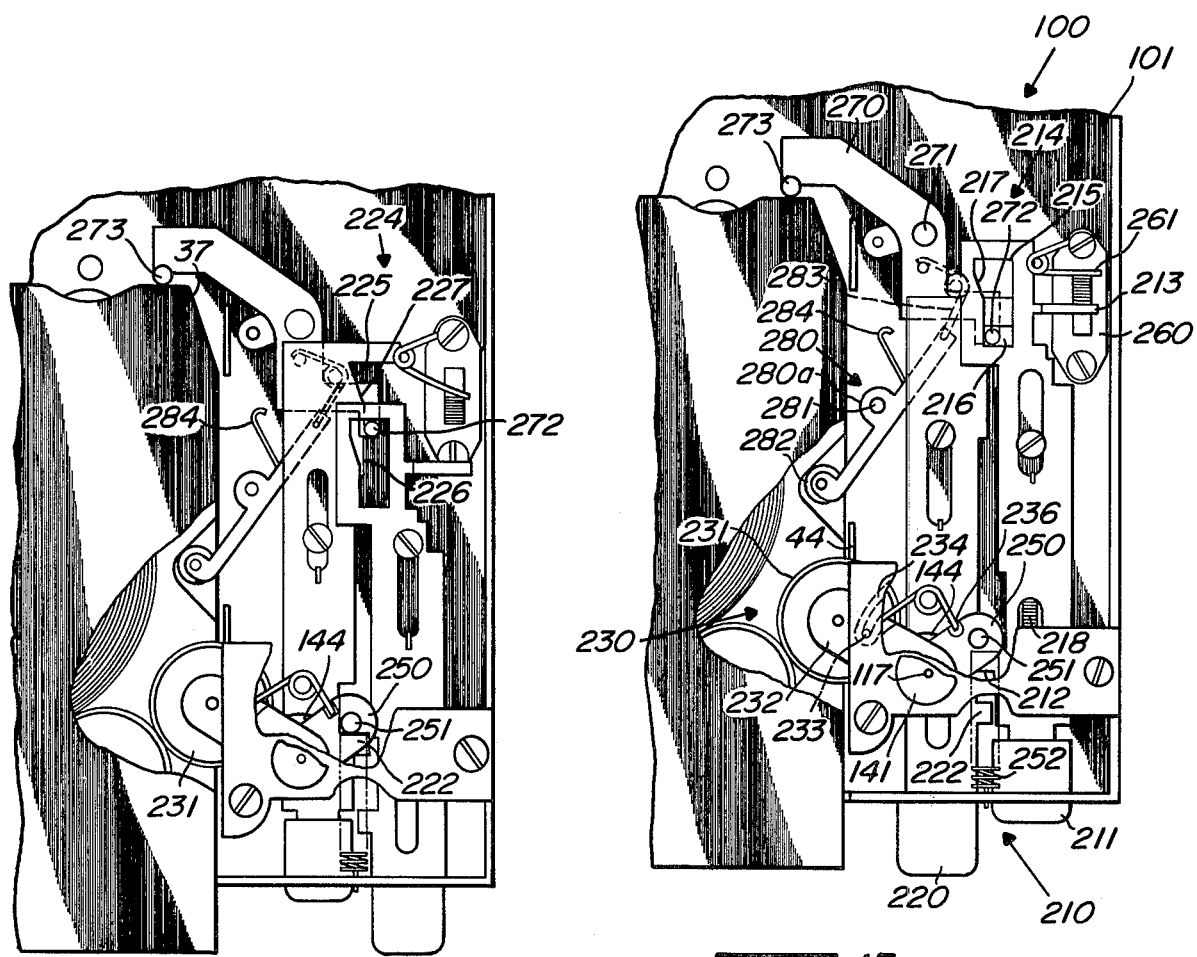
FIG. 15 is a plan view in partial section of the side drive mechanism of FIG. 14 showing the reverse mode of operation.
FIG. 16 is a plan view in partial section similar to FIG. 15 but showing the fast forward mode of operation.

FIGS. 14, 15 and 16 show an improved version of the side drive means in the housing to be used for driving the tape and hub in the player 100 in either a reverse or fast forward direction. The embodiment of FIGS. 14 to 16 is an improvement of the side drive shown in FIGS. 12 to 13.

The side drive means of FIG. 14 is constructed in the following manner. Tape player 100 includes a player housing 101 and a drive means not shown but which, as will be understood by those skilled in the art, includes a standard drive motor and drive motor pulley, a fly wheel driven by the drive motor pulley and to which is coupled a capstan which drives the tape through the cartridge in the forward direction during a normal playback mode of operation of the player, a drive belt and a main drive wheel 141 which rotates about shaft 117 and which is directly coupled to a secondary drive wheel ring 144 whereby a driving force is available to be coupled to the hub of the cartridge, as described in greater detail below, through a side access opening 44 (FIG. 15) in the cartridge to drive the tape in a reverse or fast forward direction through the cartridge.

FIG. 14 shows an actuating means 210 and a coupling means 230 to effect the aforesaid coupling relationship with the hub of the cartridge. Actuating means 210 includes a reverse slide 211 which has its wide dimension horizontal to the player housing 101. Reverse slide 211 has a positioning arm pick up portion 212 extending laterally from the slide and a reverse switch pick up portion 213 extending laterally from the slide. Slide 211 also is formed at one end with a capstan disengage cam 214 which includes a slot having a first cammed side edge portion 215 at one end of the slot and a second cammed side edge portion 216 at the other end of the slot. The portions 215, 216 being connected by a portion 217. Slide 211 is slidable inwardly to a second position against the action of return spring 218 in which position positioning arm pick up 212 actuates the positioning arm 250, reverse switch pick up 213 actuates the reverse switch 260 and capstan disengage cam 214 actuates the capstan disengage mechanism 270 all as more fully described below. When reverse slide 211 is released, it is returned to the outward rest position by return spring 218.

Actuating means 210 further includes fast forward slide 220 which also has its wide dimension horizontally placed within the player housing 101. Fast forward slide 220 has a positioning arm pick up 222 projecting laterally from the side of slide 220 opposite the projection of positioning arm pick up 212 of the reverse slide 211 so that in the release position of both slides 211, 220 both positioning arm pick ups 212, 222 are superimposed one over the other. Fast forward slide 220 has a capstan disengage cam means 224 formed at one end of the slide and disposed in such a manner that it too is superimposed over the cam means 214 of the slide 211 when both slides are in the released position. Cam means 24 is shaped to correspond to the shape of the left side edge cam 215, 216, 217 of the slot of cam 214 of slide 211. Namely, cam 224 has a flat portion 225 corresponding to a disengaged position for the capstan disengage mechanism 270, a flat portion 226 corresponding to an engaged position of the capstan disengage mechanism 270 and an angled portion 227 connecting the portions 225 and 226 for guiding a cam follower to be described below.

The actuating means further includes positioning arm 250 pivotably mounted to shaft 117 which is secured to the housing. The other end of positioning arm 250 has a positioning arm pin 251 depending from arm 250 and which is engageable by the positioning arm pick ups 212, 222 upon actuation of either the fast forward slide 220 or the reverse slide 211. Positioning arm return spring 252 biases positioning arm 250 clockwise to a first disengaged position. Positioning arm 250 is movable to a second position in which coupling member 230 described in greater detail below is placed into coupling relationship with the drive wheel roller 144 and a peripheral wall portion 46 of the hub for driving the hub in the reverse or fast forward direction in response to actuation of the reverse slide 211 or the fast forward slide 200 respectively.

The coupling means 230 includes reverse or fast forward roller 231 rotatably mounted to drive engaging arm 232 which is pivotably mounted at the other end to the shaft 117. A drive engaging pin 233 rides in a slot 234 formed in reverse or fast forward drive support plate 235 secured to the housing by screws 237. Load spring 236 is secured at one end to the positioning arm 250 and at the other end to the drive engaging arm 232 such that the two arms are resiliently coupled together.

In operation the coupling means works as follows. When either the reverse slide 211 or the fast forward slide 220 is actuated by depressing the slide, the appropriate positioning arm pick up contacts the position arm pin 251 and causes positioning arm 250 to rotate counterclockwise as shown in FIGS. 14 and 15. The rotative movement of positioning arm 250 is transmitted resiliently by load spring 236 to fast forward or reverse roller 231 by pivoting drive arm 232 about shft 117 and sliding drive pin 233 in slot 234. Thereby, the reverse, fast forward roller 231 is moved laterally through the access opening 44 into coupled relationship with the tape, the hub or an idler wheel in the cartridge for driving the hub in a reverse or fast forward mode as desired as aforesaid. When the fast forward or reverse roller 231 is moved to the coupled position it is placed into contact with drive roller 144 which provides the rotative force from the player drive motor.

In order to achieve the desired rotation of reverse or fast forward roller 231 in the desired direction, a reverse switch 260 is secured to housing 101 for actuation to reverse the direction of rotation of the drive motor. In FIG. 15 it is shown that the motor is reversed when slide 211 is depressed but not when slide 220 is depressed. Reverse switch spring 261 biases reverse switch 260 back to its original position when slide 211 is released.

Capstan disengage lever 270 is an L shaped lever pivoted about a shaft 271 and having at one end a cam follower 272 which rides in the opening of the slot of slide 211 for engagement by the cam side edge 214 of that opening or the single cam side edge 224 of slide 220. The other end of capstan disengage lever 270 has a knob 273 which is used for contacting the front wall of the cartridge to move it outwardly in the cartridge cavity when either slide 211 or slide 220 is depressed. Depressing either slide causes the cam edge 216, 217 of slide 211 or edge 226, 227 of slide 220 to cause cam follower 272 to move to the right and to the rear as shown in FIG. 15. This counterclockwise movement momentarily kicks the cartridge outwardly disengaging the capstan from the tape and pressure roller in the front wall of the cartridge.

When the slide is released it is returned to its first position by its appropriate return spring positioning cam follower 272 adjacent the disengage position 215, 225 of the cams whereby the cartridge is automatically moved into the fully inserted position in the player cavity by the cartridge locking means 280 described in further detail below which action rotates the capstan disengage lever 270 back to its first disengaged position.

Instead of separate cam means 214, 224 and a cam follower 272, an arrangement similar to the positioning arm pin 251 and pick up arms 212, 222 could be used. Namely, the cams 214, 224 could be replaced by squared off pick up arms (not shown) extending laterally from slides 211, 220 (in a manner similar to arms 212, 222) such that upon actuation of either slide 211 or 220, the respective pick up arm contacts pin 272 and rotates the capstan disengage lever 270 counterclockwise to move the cartridge outwardly of the cavity.

The cartridge locking means 280 includes a lock arm 280a pivotably mounted to the housing at pin 281. Rotatably mounted at one end of the lock arm is locking arm roller 282 which is designed for cooperation with the notch of the cartridge 30 as is well known in the industry. The other end of the locking arm 280 is biased in a first direction by an over-center locking arm detent spring 283 which biases the locking arm roller 282 into the notch and against the inclined edge of the notch of the cartridge thereby to bias the cartridge into the fully inserted position in the cavity. Cartridge engaging spring 284 is secured to locking arm 280a. When the cartridge is removed the locking arm 280a and roller 282 are forced out of the notch. Over-center locking arm detent spring 283 biases arm 280a into the other over-center condition which locates cartridge engaging spring 284 into the cartridge cavity. Similarly when the cartridge is initially installed into the cavity the inclined leading edge 37 of the cartridge contacts spring 284 and forces the locking arm 280a into the first over-center condition until the locking arm roller 282 can enter the notch and pull the cartridge into the fully inserted direction thereby locking the cartridge in the cavity.

FIG. 16 shows the fast slide depressed, positioning arm pick up 222 engaged with positioning arm pin 251, positioning arm 250 moved counterclockwise coupling the reverse-fast forward roller 231 into the coupled position with the idler wheel of the cartridge and the secondary wheel 144 of the drive wheel 141, the cam follower 272 moved rightward forcing knob 273 and the cartridge outwardly relative to the cavity to disengage the capstan from the pressure roll.

As previously noted FIG. 15 shows the reverse switch means 260 being actuated by the reverse lever 211. It will be obvious to those skilled in the art that with appropriate other changes, the reverse lever 260 could be actuated by depression of the fast forward lever 220 instead of by slide 211 if desired.

The above-described cartridge tape player and cartridge form a system wherein the tape can be driven through the cartridge in a fast forward or reverse mode of operation by means of a side drive mechanism which is laterally moved into a coupled relation with the tape or the hub or both through a side access opening in the cartridge. The fact that these drive mechanisms are laterally movable as previously explained and positioned to the side rather than underneath or above the cartridge enables us to provide a system which has a distinctly low profile and a thin look. Means are thus provided for building a 1 inch high tape player and cartridge system even though industry standards require that the player operate with cartidges up to 0.890 inches thick.

In the tape player system of the present invention, the basic elements of a standard cartridge tape player system are retained. Only the the modifications described heretofore are made to the standard player and cartridge to provide the unique side drive with reverse and fast forward functions.

While a particular embodiment of the invention has been shown and described, it should be understood that the invention is not limited thereto since many modifications may be made. It is therefore contemplated to cover by the present application any and all such modifications as for or within the true spirit and scope of the appended claims.

We claim:

1. A reversible cartridge tape player for a continuous loop cartridge having
    a hub means rotatably mounted in the cartridge,
    a continuous loop tape wound on the hub means and adapted for being driven through the cartridge in a forward direction by being removed from the hub means at the inner convolution and returned to the hub means at the outer convolution, and
    tape guide means for guiding the inner convolution of tape onto the hub means when the tape is driven in the reverse direction
    wherein the tape player comprises:
    a housing having a cartridge receiving cavity therein,
    tape playing and driving instrumentalities including a capstan drive shaft mounted on the housing in communication with the cavity and adapted for driving the tape in the forward direction when the tape cartridge is fully inserted in the cavity during a normal playback mode of operation of the player,
    drive means mounted in the housing for driving the tape in a reverse direction through the cartridge during a rewind mode of operation of the player,
    means mounted in the housing for coupling the drive means to a peripheral surface portion of the cartridge hub means at a point radially displaced from the axis of rotation of the cartridge hub means,
    means mounted in the housing for engaging the drive means with the coupling means to drive the hub means in the reverse direction, and
    means for disengaging the capstan tape drive during the rewind mode of operation by moving the cartridge outwardly slightly in the cartridge receiving cavity,
    whereby during the rewind mode of operation of the player the tape is driven through the cartridge by being removed from the hub means at the outer convolution and returned to the hub means at the inner convolution.

2. A reversible cartridge tape player for a continuous loop cartridge having
    a hub means rotatably mounted in the cartridge;
    a continuous loop tape wound on the hub means and adapted for being driven through the cartridge in a forward direction by being removed from the hub means at the inner convolution and returned to the hub means at the outer convolution, and
    tape guide means for guiding the inner convolution of tape onto the hub means when the tape is driven in the reverse direction
    wherein the tape player comprises:
    a housing having a cartridge receiving cavity therein, tape playing and driving instrumentalities including
a capstan drive shaft mounted on the housing in communication with the cavity and adapted for driving the tape in the forward direction when the tape cartridge is fully inserted in the cavity during a normal playback mode of operation of the player,
drive means mounted in the housing for driving the tape in a reverse direction through the cartridge during a rewind mode of operation of the player,
means mounted in the housing for coupling the drive means to a peripheral surface portion of the cartridge hub means at a point radially displaced from the axis of rotation of the cartridge hub means,
means mounted in the housing for engaging the drive means with the coupling means to drive the hub means in the reverse direction, and
means for disengaging the capstan tape drive during the rewind mode of operation,
wherein the peripheral surface portion is a substantially vertical wall portion of the hub, and wherein the coupling means is laterally movable into coupled relation with the vertical wall portion of the cartridge hub means,
whereby during the rewind mode of operation of the player the tape is driven through the cartridge by being removed from the hub means at the outer convolution and returned to the hub means at the inner convolution.

3. A reversible cartridge tape player as claimed in claim 2 wherein
the coupling means is movable into coupled relation with the outer convolution of tape wound on the hub means whereby the convolutions of tape wound between the hub means and the coupling means are squeezed and the hub means and the innermost convolution of tape are thereby driven at an angular velocity greater than the angular velocity of the coupling means and the outermost convolution of tape nearest the coupling means.

4. The reversible cartridge tape player as claimed in claim 3 wherein the coupling means is adapted to cooperate with an idler wheel in the cartridge to effect the coupled relation with the outer convolution of tape.

5. A reversible cartridge tape player as claimed in claim 2 wherein the peripheral surface portion of the hub means further includes a circumferential rim portion extending axially beyond the tape wound on the hub means and having a side edge portion and wherein
the coupling means is movable into coupled relation with the side edge portion of the rim for directly driving the hub means in the reverse direction.

6. A reversible cartridge tape player as claimed in claim 5 wherein the coupling means is adapted to cooperate with an idler wheel in the cartridge to effect the coupled relation with the rim portion of the hub means.

7. A reversible cartridge tape player as claimed in claim 2 wherein
the coupling means is simultaneously coupled through a first means to the outer convolution of tape wound on the hub means and through a second means to a rim portion of the hub means whereby all of the convolutions of tape wound on the hub means are squeezed between the hub means and the coupling means and whereby the hub means and the innermost convolution of tape are driven at an angular velocity greater than the angular velocity of the coupling means and the outermost convolution of tape.

8. A reversible cartridge tape player as claimed in claim 7 wherein the coupling means is adapted to cooperate with at least one idler wheel in the cartridge to effect the simultaneous coupled relation with the outer convolution of tape and the rim portion of the hub means.

9. A reversible cartridge tape player for a continuous loop cartridge having
a hub means rotatably mounted in the cartridge,
a continuous loop tape wound on the hub means and adapted for being driven through the cartridge in a forward direction by being removed from the hub means at the inner convolution and returned to the hub means of the outer convolution, and
tape guide means for guiding the inner convolution of tape onto the hub means when the tape is driven in the reverse direction
wherein the tape player comprises:
a housing having a cartridge receiving cavity therein,
a capstan drive shaft mounted on the housing in communication with the cavity and adapted for driving the tape in the forward direction when the tape cartridge is fully inserted in the cavity during a normal playback mode of operation of the player,
drive means mounted in the housing for driving the tape in a reverse direction through the cartridge during a rewind mode of operation of the player,
means mounted in the housing for coupling the drive means to a peripheral surface portion of the cartridge hub means at a point radially displaced from the axis of rotation of the cartridge hub means,
means mounted in the housing for engaging the drive means with the coupling means to drive the hub means in the reverse direction, and
mens for disengaging the capstan tape drive during the rewind mode of operation
wherein the coupling means is a rotatable member pivotably mounted in the housing for movement between a first position uncoupled from the peripheral surface portion of the hub means and a second position in coupled relation with the peripheral surface portion in response to movement of the engaging means,
whereby during the rewind mode of operation of the player the tape is driven through the cartridge by being removed from the hub means at the outer convolution and returned to the hub means at the inner convolution.

10. A reversible cartridge tape player as claimed in claim 9 wherein
the rotatable member is mounted in the housing at a predetermined location adjacent the side edge of the cartridge receiving cavity.

11. A reversible cartridge tape player as claimed in claim 10 adapted for cooperation with a cartridge having a housing which has upstanding side walls, one of said side walls having an access opening therein wherein the predetermined mounting location of the rotatable member is adjacent the access opening in the side wall of the cartridge for being operatively coupled to the hub means through the access opening.

12. A reversible cartridge tape player as claimed in claim 11 wherein the drive means comprises
a drive motor
and means for coupling the drive motor to the rotatable member.

13. A reversible cartridge tape player as claimed in claim 12 wherein the drive means further comprises
a drive motor pulley driven by the drive motor,
a flywheel,
a capstan coupled to the flywheel,
main drive wheel, and
belt means for coupling the drive motor pulley to the flywheel and main drive wheel means,
the engaging means being movable to couple the main drive wheel means to the rotatable member.

14. A reversible cartridge tape player as claimed in claim 12 wherein
the means for coupling the drive motor to the rotatable member includes a main drive wheel rotatably mounted in the housing and coupled to the drive motor,
and wherein the engaging means includes
an actuator arm movably mounted in the housing between a first position corresponding to a playback mode of operation of the player and a second position corresponding to a rewind mode of operation of the player,
the actuator arm being cooperable with the rotatable member for coupling the rotatable member to the main drive wheel and to the hub means when the actuator arm is moved into the second position and for uncoupling the rotatable member from the hub means when the actuator arm is moved to the first position whereby in the second position the rotating member is driven by the main drive wheel for driving the tape in the reverse direction.

15. The reversible cartridge tape player as claimed in claim 14 wherein the engaging means further comprises
means mounted in the housing for driving the hub means in a fast forward mode of operation of the tape player.

16. A reversible cartridge tape player as claimed in claim 15 wherein the means for coupling the drive motor to the rotatable member to drive the hub in a reverse direction includes an idler wheel interposed between the rotatable member and the main drive wheel when the actuator arm is moved to the second position, and wherein
the fast forward driving means includes
the actuator arm being movable between the first position and a third position corresponding to a fast forward mode of operation of the tape player and further comprising
a fast forward drive wheel pivotably mounted in the housing,
the actuator arm having means cooperable with the fast forward drive wheel for coupling the latter to the main drive wheel for rotation of the fast forward drive wheel in a direction opposite the direction of rotation of the rotatable member from the first position to the third position and for coupling the fast forward drive pulley to the peripheral surface portion of the cartridge hub means at the point radially displaced from the axis of rotation of the cartridge hub means for driving the hub means and the tape in a forward direction at a speed faster than the forward movement of the tape in the playback mode.

17. A reversible cartridge tape player as claimed in claim 16 wherein the cooperable means is a fast forward bracket pivotably mounted at one end of the player housing, a fast forward roller rotatably mounted to the other end of the fast forward bracket and means for pivoting the fast forward bracket to move the fast forward roller into the coupled relation.

18. A reversible cartridge tape player as claimed in claim 15 wherein the means for driving the hub means in a fast forward direction includes
a second actuator arm means mounted in the housing movable between a first rest position and a second position corresponding to a fast forward mode of operation of the player, the second actuator arm being cooperable with the rotatable member for coupling the rotatable member to the main drive pulley and to the hub means as aforesaid in response to movement of the second actuator arm from the first to the second position,
further comprising switching means for reversing the direction of rotation of the drive motor in response to movement of the fast forward acutator arm from the first to the second position whereby the hub means is driven by the rotatable member in forward direction at a speed faster than the forward movement of the tape in the playback mode.

19. A reversible cartridge tape player as claimed in claim 18 further comprising
a positioning arm resiliently coupled to the rotatable member,
a pin depending from the positioning arm,
means on each of the first and second actuator arms for moving the pin of the positioning arm, and thereby moving the rotatable member into coupled relation with the hub means upon actuation of either of the actuator arms to then respective aforesaid second positions.

20. A reversible cartridge tape player as claimed in claim 15 further comprising
means for moving the cartridge outwardly in the cavity from the fully inserted position out of driving engagement with the capstan when the engaging means is moved to either the rewind position or to the fast forward position.

21. A reversible cartridge tape player for a continuous loop cartridge having
a hub means rotatably mounted in the cartridge and having an upstanding wall portion spaced a predetermined distance from the axis of rotation thereof,
a support member having front and side walls,
a first access opening in the front wall,
a second access opening in the side wall,
a continuous loop tape wound on the hub means and adapted for being driven through the cartridge in a forward direction by being removed from the hub means at the inner convolution and returned to the hub means at the outer convolution, and
tape guide means for guiding the tape the upstanding wall portion of the hub means when the tape is driven in the reverse direction
wherein the tape player comprises:
a housing having a cartridge receiving cavity therein,
tape playing and driving instrumentalities including a capstan drive shaft mounted on the housing in communication with the cavity and adapted for being coupled to the tape through the first access opening and driving the tape in the forward direction when the tape cartridge is fully inserted in the cavity during a normal playback mode of operation of the player, drive means mounted in the housing for driving the tape in a reverse direction through the cartridge during a rewind mode of operation of the player, means mounted in the housing for coupling the drive means to the upstanding wall portion of the cartridge hub means through the second access opening, means mounted in the housing for engaging the drive means with the coupling means to drive the hub means, and means for disengaging the capstan tape drive during the rewind mode of operation by moving the cartridge outwardly slightly in the cartridge receiving cavity, whereby during the rewind mode of operation of the player the tape is driven through the cartridge by being removed from the hub means at the outer convolution and returned to the hub means at the inner convolution.

22. A reversible cartridge tape player system comprising:

a continuous loop cartridge having a hub means rotatably mounted in the cartridge and having an upstanding wall portion spaced a predetermined distance from the axis of rotation thereof, and a continuous loop tape wound on the hub means and adapted for being driven through the cartridge in a forward direction by being removed from the hub means at the inner convolution and returned to the hub means at the outer convolution, and tape guide means for guiding the tape onto the upstanding wall portion of the hub means when the tape is driven in the reverse direction, and a tape player having a housing having a cartridge receiving cavity therein, a tape player and driving instrumentalities including a capstan drive shaft mounted on the housing in communication with the cavity and adapted for driving the tape in the forward direction with the tape cartridge being fully inserted in the cavity during a normal playback mode of operation of the player, drive means mounted in the housing for driving the tape in a reverse direction through the cartridge during a rewind mode of operation of the player, means mounted in the housing for coupling the drive means to the upstanding wall portion of the cartridge hub means at a point radially displaced from the axis of rotation of the cartridge hub means, means mounted in the housing for engaging the drive means with the coupling means to drive the hub means in the reverse direction, and means for disengaging the capstan tape drive during the rewind mode of operation by moving the cartridge outwardly slightly in the cartridge receiving cavity, whereby during the rewind mode of operation of the player the tape is driven through the cartridge by being removed from the hub means at the outer convolution and returned to the hub means at the inner convolution.

23. A reversible cartridge tape player system comprising;

a continuous loop cartridge having a hub means rotatably mounted in the cartridge and having an upstanding wall portion spaced a predetermined distance from the axis of rotation thereof, and a continuous loop tape wound on the hub means and adapted for being driven through the cartridge in a forward direction by being removed from the hub means at the inner convolution and returned to the hub means at the outer convolution, and tape guide means for guiding the tape onto the upstanding wall portion of the hub means when the tape is driven in the reverse direction, and a tape player having a housing having a cartridge receiving cavity therein, tape playing and driving instrumentalities including a capstan drive shaft mounted on the housing in communication with the cavity and adapted for driving the tape in the forward direction with the tape cartridge being fully inserted in the cavity during a normal playback mode of operation of the player, drive means mounted in the housing for driving the tape in a reverse direction through the cartridge during a rewind mode of operation of the player, means mounted in the housing for coupling the drive means to the upstanding wall portion of the cartridge hub means at a point radially displaced from the axis of rotation of the cartridge hub means, means mounted in the housing for engaging the drive means with the coupling means to drive the hub means in the reverse direction, and means for disengaging the capstan tape drive during the rewind mode of operation wherein the upstanding wall has a vertical peripheral surface portion and the coupling means is laterally movable into coupled relation with the vertical peripheral surface portion, whereby during the rewind mode of operation of the player the tape is driven through the cartridge by being removed from the hub means at the outer convolution and returned to the hub means at the inner convolution.

24. A reversible cartridge tape player system as claimed in claim 22 wherein the coupling means is a rotatable member pivotably mounted in the housing for lateral movement between a first position uncoupled from the upstanding wall portion of the hub means and a second position in coupled relation with the upstanding wall portion in response to movement of the engaging means.

25. A reversible cartridge tape player system as claimed in claim 24 wherein the rotatable member is mounted in the housing at a predetermined location adjacent a side edge of the cartridge receiving cavity.

26. A reversible cartridge tape player system as claimed in claim 25 further comprising the cartridge having a support member with an upstanding front and an upstanding side wall, a first access opening in the front wall, a second access opening in the side wall, the capstan being coupled to the tape through the first access opening to drive the tape in a forward direction during the normal playback mode, the predetermined mounting location of the rotatable member being adjacent the second access opening, and the rotatable member being operatively coupled to the hub means through the second access opening in the rewind mode of operation.

27. A reversible cartridge tape player system as claimed in claim 23 wherein
the coupling means is movable into coupled relation with the outer convolution of tape wound on the hub means whereby the convolutions of tape wound between the hub means and the coupling means are squeezed and the hub means and the innermost convolution of tape are thereby driven at an angular velocity greater than the angular velocity of the coupling means and the outermost convolution of tape nearest the coupling means.

28. the reversible cartridge tape player system as claimed in claim 27 further comprising an idler wheel rotatably mounted within the cartridge and pivotable between a first position disengaged from the outer convolution of tape and a second position engaging the outer convolution of tape in response to movement of the coupling means to effect the coupled relation with the outer convolution of tape.

29. A reversible cartridge tape player system as claimed in claim 23 wherein the vertical peripheral surface portion of the hub further comprises a circumferential rim portion extending axially beyond the tape wound on the hub means and having a side edge portion and wherein the coupling means is coupled to the side edge rim portion for directly driving the hub means in the reverse direction.

30. A reversible cartridge tape player system as claimed in claim 29 further comprising an idler wheel rotatably mounted within the cartridge and pivotable between a first position disengaged from the rim portion of the hub means and a second position engaging the said rim portion in response to movement of the coupling means to effect the coupled relation with the rim portion of the hub means.

31. A reversible cartridge tape player system as claimed in claim 23 wherein
the coupling means is simultaneously coupled through a first means to the outer convolution of tape wound on the hub means and through a second means to the upstanding wall of the hub means whereby all of the convolutions of tape wound on the hub means are squeezed between the hub means and the coupling means and whereby the hub means and the innermost convolution of tape are driven at an angular velocity greater than the angular velocity of the coupling means and the outermost convolution of tape.

32. A reversible cartridge tape player system as claimed in claim 31 wherein
the first means is idler wheel means rotatably mounted in the cartridge and pivotable between a first position disengaged from the outer convolution of tape and a second position engaging the outer convolution of tape, and
the second means is idler wheel means rotatably mounted in the cartridge and pivotable between a first position disengaged from the upstanding wall of the hub means and a second position engaging the upstanding wall,
the first and second idler wheels being moved from their first to their second respective positions in response to the coupling means being moved to the coupled position to effect the simultaneous coupled relation with the outer convolution of tape and the upstanding wall of the hub means.

33. A reversible cartridge tape player system as claimed in claim 32 wherein the first and second means are coaxially mounted in the cartridge.

34. A reversible cartridge tape player system as claimed in claim 26 wherein the drive means comprises
a drive motor and means for coupling the drive motor to the rotatable member,
and further comprising
means mounted in the housing for driving the hub means in a fast forward mode of operation of the tape player, and
means for selectively engaging the fast forward drive means with the coupling means to drive the hub means in the fast forward direction, and
means for moving the cartridge outwardly in the cavity from the fully inserted position out of driving engagement with the capstan when the engaging means is moved to either the rewind position or to the fast forward position.

35. A continuous loop reversible tape cartridge for use in a cartridge tape player having
a housing having a tape cartridge receiving cavity therein,
tape playing and driving instrumentalities including a capstan drive shaft mounted on the housing in communication with the cavity and adapted for driving a tape in the forward direction through the cartridge when the tape cartridge is fully inserted in the cavity during a normal playback mode of operation of the player,
drive means mounted in the housing for driving the tape in a reverse direction through the cartridge during a rewind mode of operation of the player,
control means mounted in the housing for selectively coupling the drive means to the tape cartridge, and
means for disengaging the capstan tape drive during the rewind mode of operation
wherein the tape cartridge comprises:
a support housing having at least a front wall and a side wall and being dimensioned for receipt in the cavity,
a first access opening in the front wall,
a second access opening in the side wall,
a hub means rotatably mounted in the cartridge,
a continuous loop tape wound on the hub means and adapted for being coupled to the capstan through the first access opening and driven through the cartridge in a forward direction by being removed from the hub means at the inner convolution and returned to the hub means at the outer convolution
the hub means having an upstanding wall portion spaced a predetermined distance from the axis of rotating thereof and adapted to be coupled to the drive means through the second access opening in the rewind mode of operation in response to actuation of the control means, and
tape guide means for guiding the inner convolution of tape onto the upstanding wall portion in the reverse direction
wherein the upstanding wall has a substantially vertical peripheral surface portion to which the drive means is coupled,
whereby during the rewind mode of operation of the player the tape is driven in the reverse direction through the cartridge by being removed from the hub means at the outer convolution and returned to the hub means at the inner convolution.

36. A continuous loop reversible tape cartridge as claimed in claim 35 wherein the player includes a coupling means for coupling the drive means to the cartridge and wherein the outer convolution of tape wound on the hub means is coupled to the coupling means whereby the convolutions of tape wound between the hub means and the coupling means are squeezed and the hub means and the innermost convolution of tape are thereby driven at an angular velocity greater than the angular velocity of the coupling means and the convolution of tape nearest the coupling means.

37. A continuous loop reversible tape cartridge as claimed in claim 36 further comprising an idler wheel rotatably mounted within the cartridge and pivotable between a first position disengaged from the outer convolution of tape and a second position engaging the outer convolution of tape in response to movement of the coupling means to effect the coupled relation with the outer convolution of tape.

38. A continuous loop reversible cartridge as claimed in claim 36 wherein the vertical peripheral surface of the hub means further includes a circumferential rim portion extending axially beyond the tape wound on the hub means and having a side edge which is adapted to be coupled to the coupling means for directly driving the hub means in the reverse direction.

39. A continuous loop reversible tape cartridge as claimed in claim 38 further comprising an idler wheel rotatably mounted within the cartridge and pivotable between a first position disengaged from the rim portion of the hub means and a second position engaging the said rim portion in response to movement of the coupling means to effect the coupled relation.

40. A continuous loop reversible tape cartridge as claimed in claim 35 further comprising a first rotatable means and a second rotatable means, and wherein the coupling means is simultaneously coupled through the first means to the outer convolution of tape wound on the hub means and through the second means to the upstanding wall of the hub means whereby all of the convolutions of tape wound on the hub means are squeezed between the hub means and the coupling means and whereby the hub means and the innermost convolution of tape are driven at a angular velocity greater than the velocity of the coupling means and the outermost convolution of tape.

41. A continuous loop reversible tape cartridge tape player as claimed in claim 40 wherein the first means is idler wheel means rotatably mounted in the cartridge and pivotable between a first position disengaged from the outer convolution of tape and a second position engaging the outer convolution of tape, and the second means is idler wheel means rotatably mounted in the cartridge and pivotable between a first position disengaged from the upstanding wall of the hub means and a second position engaging the upstanding wall, the first and second idler wheels being moved from their first to their second respective positions in response to the coupling means being moved to the coupled position through actuation of the control means to effect the simultaneous coupled relation with the outer convolution of tape and the upstanding wall of the hub means.

42. A continuous loop tape cartridge as claimed in claim 41 comprising the upstanding wall portion having an interior peripheral surface wall portion wherein the second means is in coupled relation with the interior peripheral wall portion when in the second engaged position.

43. A continuous loop reversible tape cartridge as claimed in claim 41 wherein the first and second means are coaxially mounted in the cartridge.

44. A continuous loop tape cartridge as claimed in claim 35 adapted for being driven in a fast forward direction through either the first access opening or the second access opening.

45. A continuous loop tape cartridge as claimed in claim 35 wherein during a transient condition of operation immediately following the initiation of the rewind mode, the instantaneous velocity of the innermost convolution of tape is greater than the instantaneous velocity of the outermost convolution of tape.

46. A continuous loop tape cartridge as claimed in claim 35 wherein the tape guide means is a portion of the upstanding wall portion of the hub extending axially beyond the top of the convolutions of tape wound on the hub means.

47. A continuous loop tape cartridge as claimed in claim 46 wherein the tape guiding portion of the wall portion has an outwardly curved shape.

48. A cartridge tape player for a continuous loop cartridge having a hub means rotatably mounted in the cartridge, and a continuous loop tape wound on the hub means and adapted for being driven through the cartridge in a first direction by being removed from the hub means at the inner convolution and returned to the hub means at the outer convolution, wherein the tape player has a housing having a cartridge receiving cavity therein tape playing and driving instrumentalities including a capstan drive shaft mounted on the housing in communication with the cavity and adapted for driving the tape in the first direction when the tape cartridge is fully inserted in the cavity during a normal playback mode of operation of the player, and drive means mounted in the housing for driving the tape in a predetermined direction through the cartridge during winding modes of operation other than normal playback wherein the improvement comprises:

means mounted in the housing for coupling the drive means to a peripheral surface portion of the cartridge hub means for driving the hub means in the predetermined direction while moving the cartridge outwardly slightly in the cartridge receiving cavity to disengage the capstan tape drive means during said winding modes of operation other than normal playback, and means mounted in the housing for selectively engaging the coupling means.

49. A two speed cartridge tape player for a continuous loop cartridge having a support member having front and side walls, a hub means rotatably mounted on the support member, a first access opening in the front wall, a second access opening in the side wall, a continuous loop tape wound on the hub means and adapted for being driven through the cartridge in a first direction by being removed from the hub means at the inner convolution and returned to the hub means at the outer convolution, the peripheral surface portion located at a point radially displaced from the axis of rotation of the cartridge hub means, wherein the tape player has a housing having a cartridge receiving cavity therein tape playing and driving instrumentalities including a capstan drive shaft mounted on the housing in communication with the cavity and adapted for being coupled to the tape through the first access opening to drive the tape in the first direction at a first predetermined speed when the tape cartridge is fully inserted in the cavity during a normal playback mode of operation of the player, drive means mounted in the housing for driving the tape in a predetermined direction through the cartridge at a second predetermined speed greater than the first predetermined speed during a fast winding mode of operation of the player, means mounted in the housing for coupling the drive means to a peripheral surface portion of the cartridge hub means for driving the hub means in the predetermined direction during said fast winding modes of operation, means mounted in the housing for selectively engaging the coupling means, and means for moving the cartridge outwardly slightly in the cartridge receiving cavity to be disengaged from the capstan drive shaft during the fast winding mode of operation wherein the coupling means is laterally movable and is adapted for coupling the drive means to the peripheral surface portion through the second access opening.

50. The two-speed tape player as claimed in claim 49 further adapted for playing the cartridge tape in a reverse direction, the continuous loop cartridge having tape guide means for guiding the inner convolution of tape onto the hub means when the tape is driven in the reverse direction, the tape player further comprising the capstan drive shaft being adapted for driving the tape in the forward direction during a normal playback mode of operation of the player, and the drive means being adapted for driving the tape in a reverse direction through the cartridge during the rewind mode of operation of the player, whereby during the rewind mode of operation of the player the tape is driven through the cartridge by being removed from the hub means at the outer convolution and returned to the hub means at the inner convolution.

* * * * *